United States Patent [19]

Lavagetto et al.

[11] Patent Number: 5,151,784
[45] Date of Patent: Sep. 29, 1992

[54] MULTIPLE FRAME MOTION ESTIMATION

[75] Inventors: Fabio Lavagetto, Genoa, Italy; Riccardo Leonardi, Geneva, Switzerland

[73] Assignee: AT&T Bell Laboratories, Murray Hill, N.J.

[21] Appl. No.: 693,878

[22] Filed: Apr. 30, 1991

[51] Int. Cl.⁵ .............................. H04N 7/12
[52] U.S. Cl. ................................... 358/136; 358/105; 358/135
[58] Field of Search ................. 358/136, 135, 105, 133

[56] References Cited

U.S. PATENT DOCUMENTS 4,667,233 5/1987 Furukawa ........................... 358/136
4,958,226 9/1990 Haskell et al. ..................... 358/136
4,985,768 1/1991 Sugiyama ........................... 358/136

OTHER PUBLICATIONS

Michael Orchard, "A Comparison of Techniques for Estimating Block Motion in Image Sequence Coding", SPIE, vol. 1199, Visual Communications and Image Processing IV (1989).

Ciro Cafforio, Fabio Rocca and Stefano Tubaro, "Motion Compensated Image Interpolation", IEEE Transactions on Communications, vol. 38, No. 2, Feb., 1990.

Mohammad Reza Haghiri and Frederic Fonsalas, "Motion Compensated Interpolation Applied to HD-MAC Pictures Encoding and Decoding", Signal Processing of HDTV, Elsevier Science Publishers B.V. (North-Holland), 1988.

Primary Examiner—James J. Groody
Assistant Examiner—Glenton B. Burgess
Attorney, Agent, or Firm—E. J. Rosenthal

[57] ABSTRACT

The invention relates to developing a signal to represent each block of an image contained in a frame being interpolated in a motion interpolated system such that the error between the frame being interpolated and the reference frames is minimized without placing any predetermined limitation on the values of either the weights or the displacements employed as motion vectors. The weights and displacements required to achieve the minimization of the interpolation error are jointly determined on a block by block basis. A set of groups having a candidate displacement from each reference frame and, in accordance with an aspect of the invention, their corresponding best weights are determined. An error signal which would result if each member of the set of groups of candidate displacements from each reference frame and their corresponding best weights were employed to represent the block is evaluated. The group having the lowest error signal is either selected to represent the block or as a starting point for the selection of a new set of groups. By employing other aspects of the invention, the number of groups which need be evaluated to represent the block can be reduced from a predetermined maximum number.

29 Claims, 9 Drawing Sheets

MULTIPLE FRAME MOTION ESTIMATION

TECHNICAL FIELD

This invention relates to video image processing, and more particularly, to a method for estimating the motion of image blocks when more than one reference frame is employed in a motion predictive image processing system.

BACKGROUND OF THE INVENTION

In video coding systems it is well known to use motion estimation techniques so as to achieve compression of the data in a video image signal that represents the video image frames (frames). An exemplary coding system is defined in the CCITT recommendation H.261. Frequently, the motion between an image frame to be encoded and a reference frame already encoded is estimated. The estimation of the motion is encoded and employed as a representation of the frame. Such a representation can be used to reconstruct the encoded frame if the reference frame is available. To this end, all frames of the video image signal are partitioned into a set of blocks comprised of $Q \times R$ picture elements (pels). Each block of a frame to be encoded in turn is assigned a motion vector, i.e., a displacement d relative to the location (as defined by a predetermined location in each block) of the block which identifies the location of a same size block in the reference frame that best matches the block. The reference frame is typically a frame in the past relative to the frame to be encoded and most often it is the immediately preceding frame. The motion vector is thus an estimate of the motion of the block from the time instant of the reference frame until the time instant of the frame to be encoded.

To select a displacement to be employed as the motion vector a search of a set of candidate displacements is employed. Typically the candidate set of displacements is comprised of all the displacements that are within a predetermined range of the location of the block in the frame to be encoded. An exhaustive search is utilized to find the displacement that best achieves a particular predetermined matching criterion which is then assigned to be the motion vector. The matching criterion used most often is the minimization of the integral of the absolute error signal, i.e., $$\min_{d} \sum_{x' \in N(x)} |I_n(x') - I_{n-1}(x' + d)| \quad (1)$$

where $x'$ is the location of an individual pel that is a member of $N(x)$, the set of locations of all the pels defining the block located at x (where x is the same predetermined point in each block and the value of x is measured with respect to the lattice structure of a frame). $I_n()$ and $I_{n-1}()$ are functions that typically yield the luminance values of the pels at the location specified by their arguments in, respectively, the frame to be encoded and the reference frame. It is noted that all displacements and locations are vectors, since they have both a horizontal and a vertical component and are therefore, like all vectors and matrices, displayed herein in boldfaced type. In some implementations, a good estimate of the optimal displacement is determined and thereafter used as the motion vector since determining such an estimate limits the search effort, i.e., time of search, required as compared with searching for the actual optimal displacement. Several well known methods for obtaining such a good estimate are, without limitation: the 3-step search, the logarithmic search and the conjugate direction search. The displacement selected as the motion vector and the corresponding error signal for each block are employed as a representation of the block. They may be further quantized or encoded as appropriate for transmission or storage.

Better compression of the data that represents the video images can be achieved by motion compensated interpolation, a motion estimation technique which incorporates an additional reference frame, which is located typically in the future relative to the frame to be coded. An interpolative system is used to predict any frames that are temporally between the reference frames. The interpolation determines for each block to be encoded a block in the past reference frame and a block in the future reference frame that when combined yield a best approximation of the block to be encoded. The combination is typically a weighted sum of the values of the pels of the selected blocks. The displacements from the block to be encoded to each of the determined blocks ($d_m$ being a displacement to a block in the reference frame in the past and $d_p$ being a displacement to a block in the reference frame in the future) are employed as estimates of the motion of the block relative to each of the reference frames and are taken as motion vectors. Additionally, an interpolation error signal is obtained by subtracting the weighted sum from the values of the pels comprising the current block.

The determination of the weights utilized for the weighted sum is typically performed by employing either predetermined limitations on the weights or predetermined limitations on the displacement candidates. For example, taking on a block by block basis either equal contribution ($\frac{1}{2},\frac{1}{2}$) from both displaced blocks or selecting to use for a block a contribution from just one of the reference frames (0,1) and (1,0) (see ISO MPEG draft proposal). The criteria for selecting the weights is typically to minimize the energy of the interpolation error signal. The motion vectors, error signal and weighting factors for each block are employed as a representation of the block. They may be further quantized or encoded as appropriate for transmission or storage.

These prior compression techniques do not optimally take advantage of the available bandwidth and therefore require a higher bandwidth to provide an optimal reconstructed image.

SUMMARY OF THE INVENTION

The difficulties with prior motion interpolation techniques are overcome, in accordance with an aspect of the invention, by developing a signal to represent each block of the image contained in the frame being interpolated such that the error between the frame being interpolated and a weighted sum of blocks in the reference frames is minimized without placing any predetermined limitation on the values of either the weights or the displacements employed as motion vectors. The weights and displacements required to achieve the minimization of the error are jointly determined on a block by block basis. A set of groups having a candidate displacement from each reference frame and, in accordance with an aspect of the invention, their corresponding best weights are determined. An error signal which would result if each member of the set of groups of candidate displacements from each reference frame and their corresponding best weights were employed to represent the block is evaluated. The group having the lowest error signal is either selected to represent the block or as a starting point for the selection of a new set of groups. The number of groups which need be evaluated to represent the block can be reduced, from the maximum number which would be necessary to evaluate if all potential groups of candidate displacements within a predetermined search range were evaluated, in accordance with an aspect of the invention, by employing either a good estimate of the optimum displacements and corresponding best weights instead of the actual optimum displacements and corresponding best weights or by making use of known properties of images and aspects of the invention. Further, predetermined constraints on the displacements and weights can be employed to achieve additional advantages. Additionally, in accordance with yet another aspect of the invention, quantized versions of the weights to actually be employed are determined such that any increase in the error of a reconstructed version of the block that is attributable to the quantization of the weights is small.

BRIEF DESCRIPTION OF THE DRAWING

In the Drawing.

A simplified block diagram of an exemplary transform video encoder embodying aspects of the invention is shown in FIG. 1.

Figure 3:
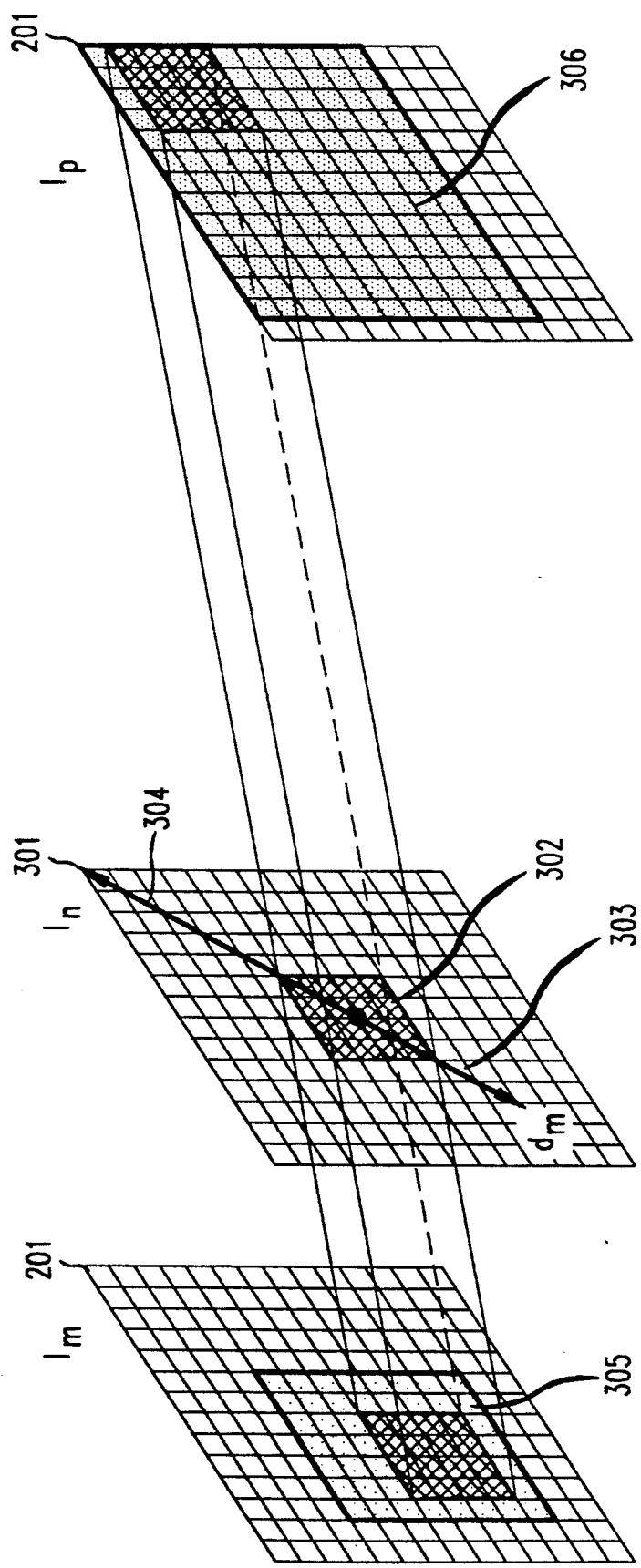
Figure 4:
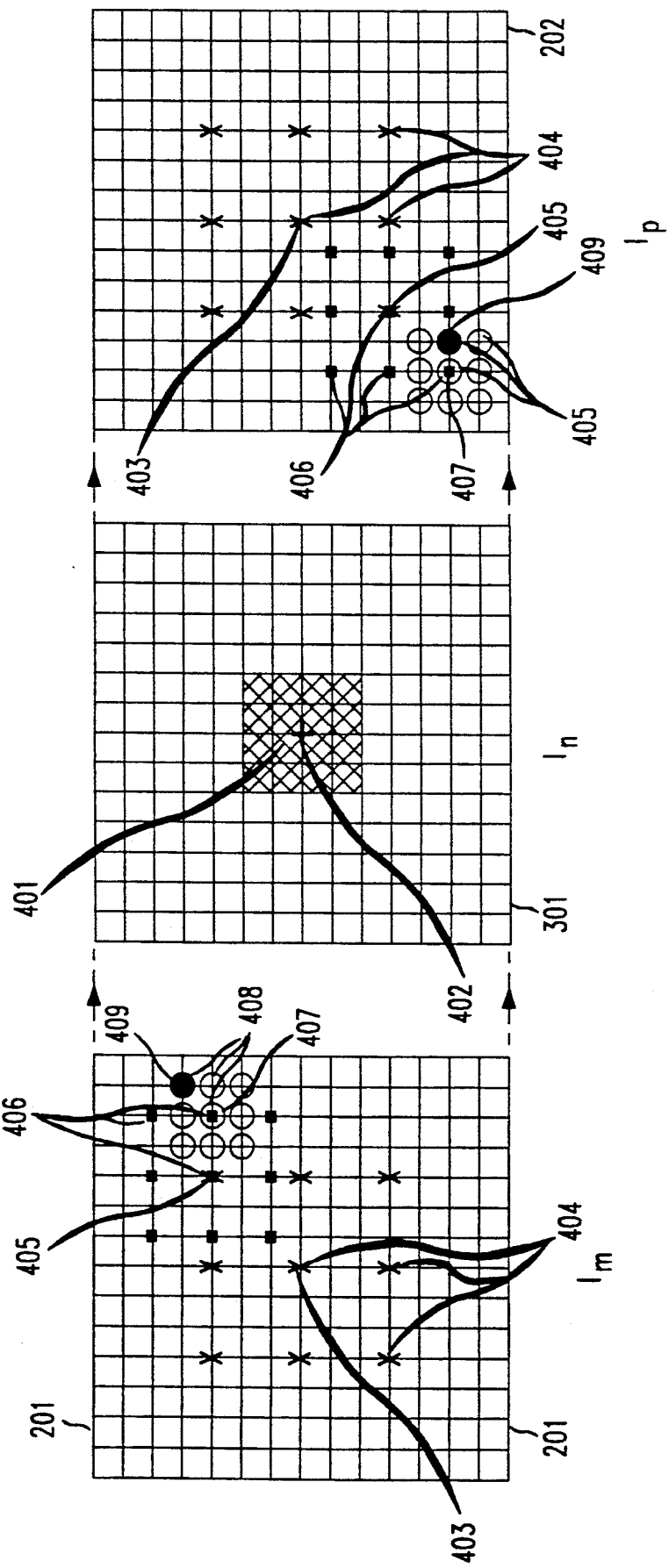
Figure 5:
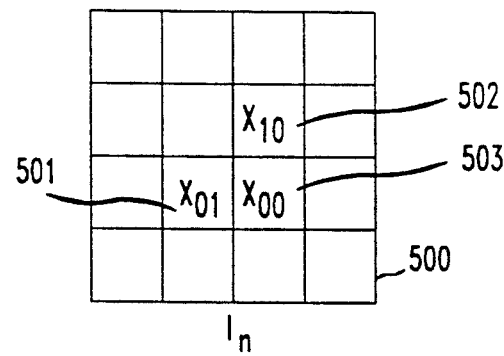
Figure 6:
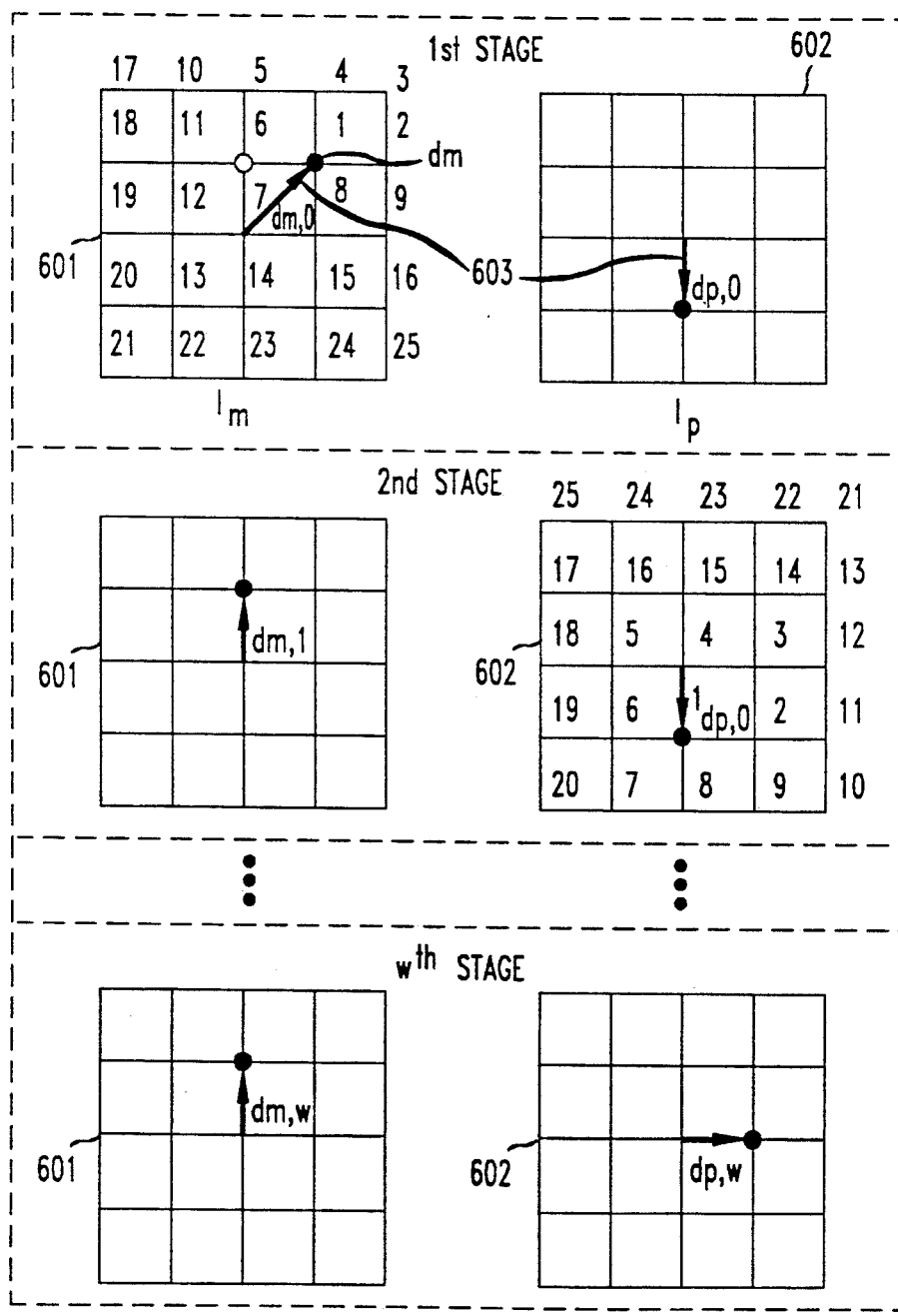
Figure 7:
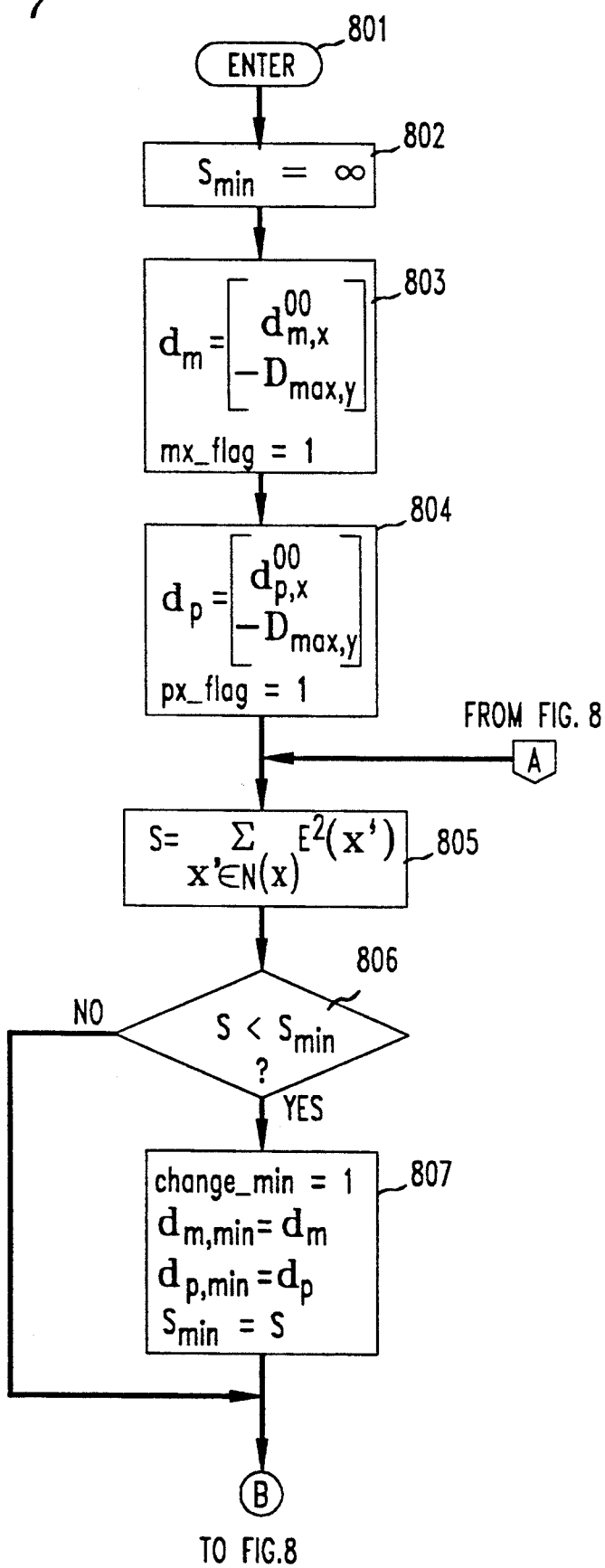
Figure 8:
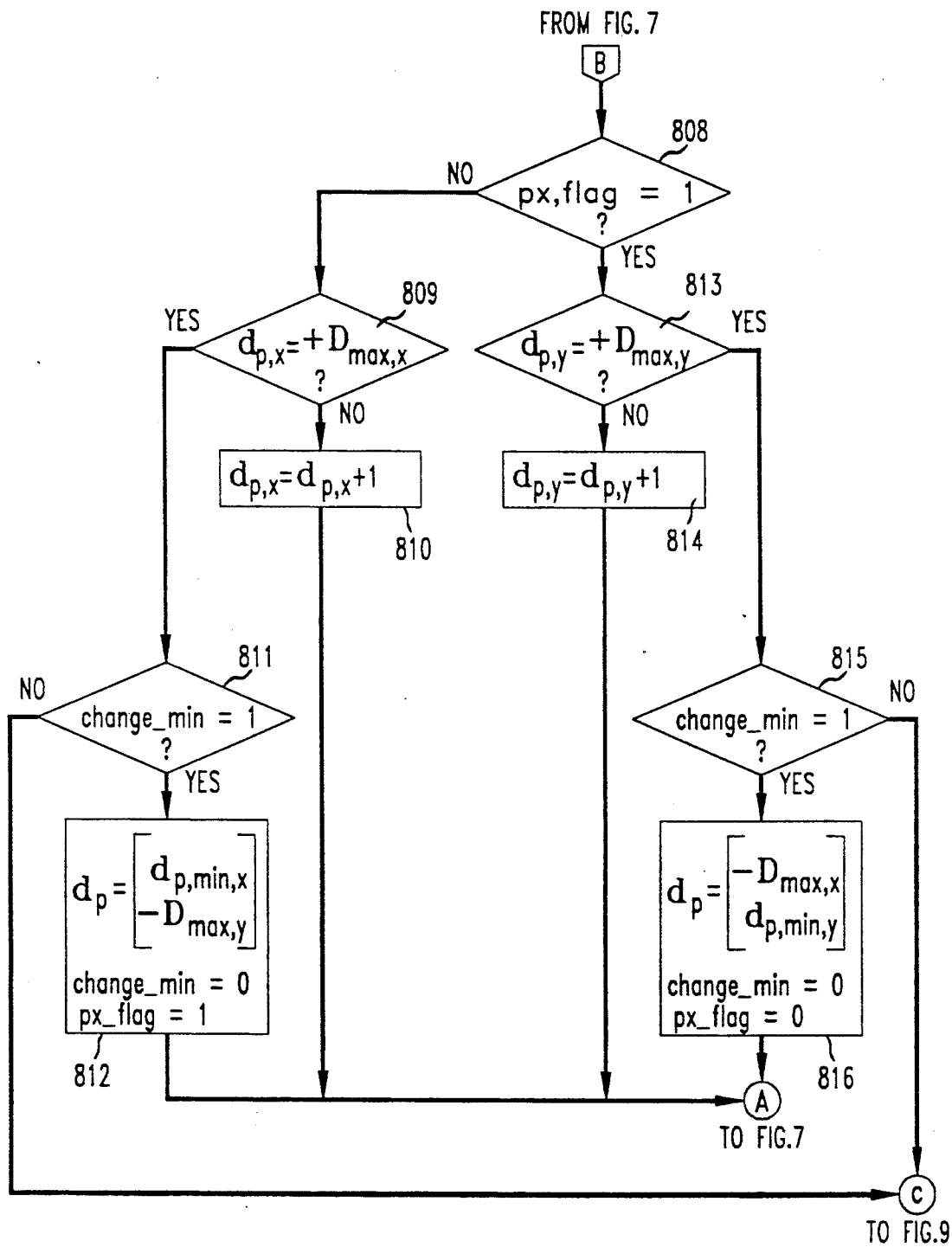
Figure 9:
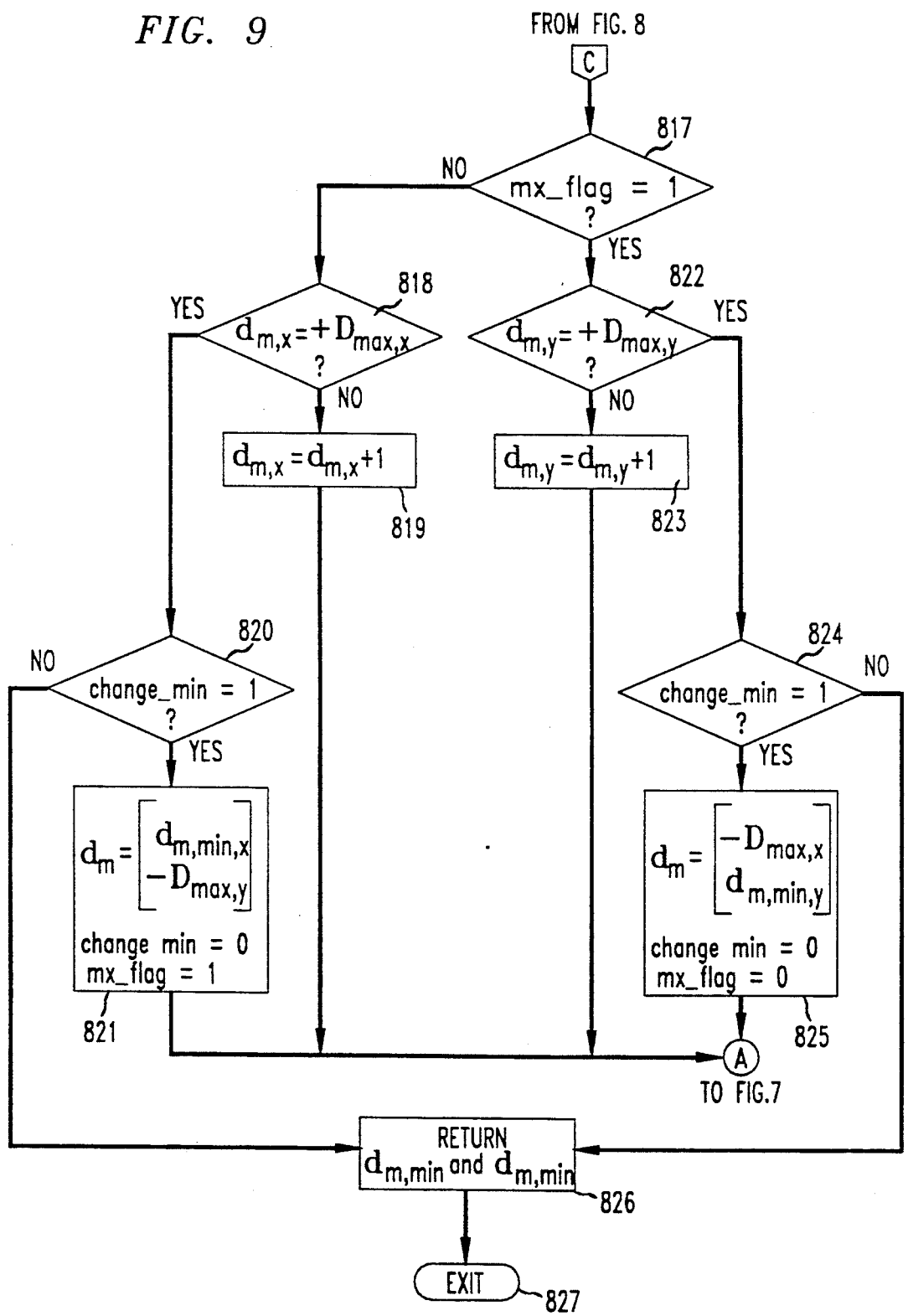
Figure 10:
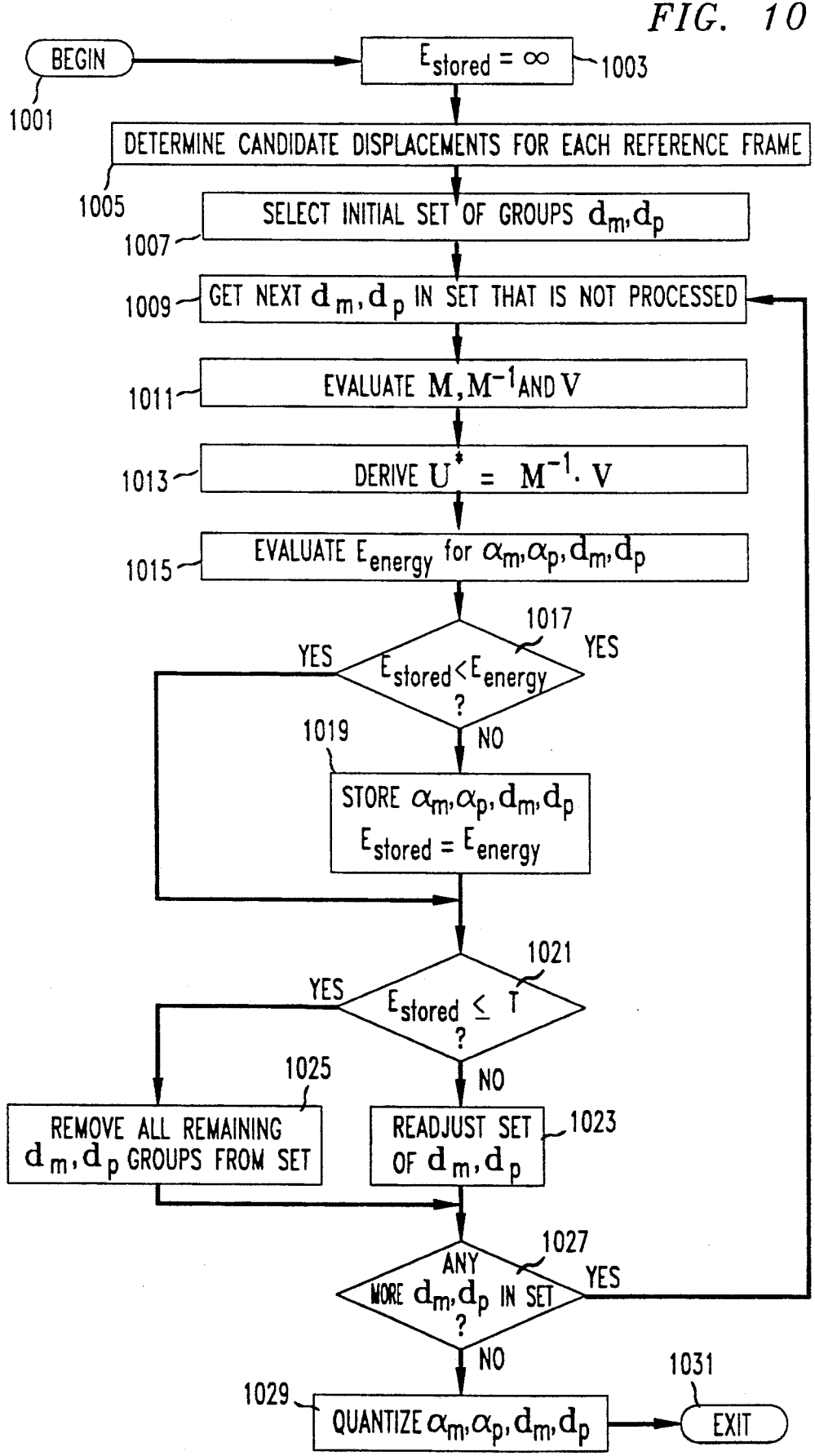

Shown in FIG. 3 is a weighted averaging process that occurs in an encoding system employing 2 reference frames;

FIG. 4 shows aspects of 3-step search strategy that can be employed when using 2 reference frames;

Shown in FIG. 5 is a portion of frame $I_n$ divided into blocks of pels;

Illustrated in FIG. 6 is a threshold search strategy with ordered scanning;

FIGS. 7, 8, and 9, when connected together, form a flow diagram of a conjugate direction search strategy that has been extended, in accordance with an aspect of the invention, for use with 2 reference frames; and Shown in FIG. 10, in flow chart form, is a simplified composite, in accordance with an aspect of the invention, of the steps required by a motion estimator to generate motion vectors and weights for a block to be encoded.

DETAILED DESCRIPTION

Figure 1:
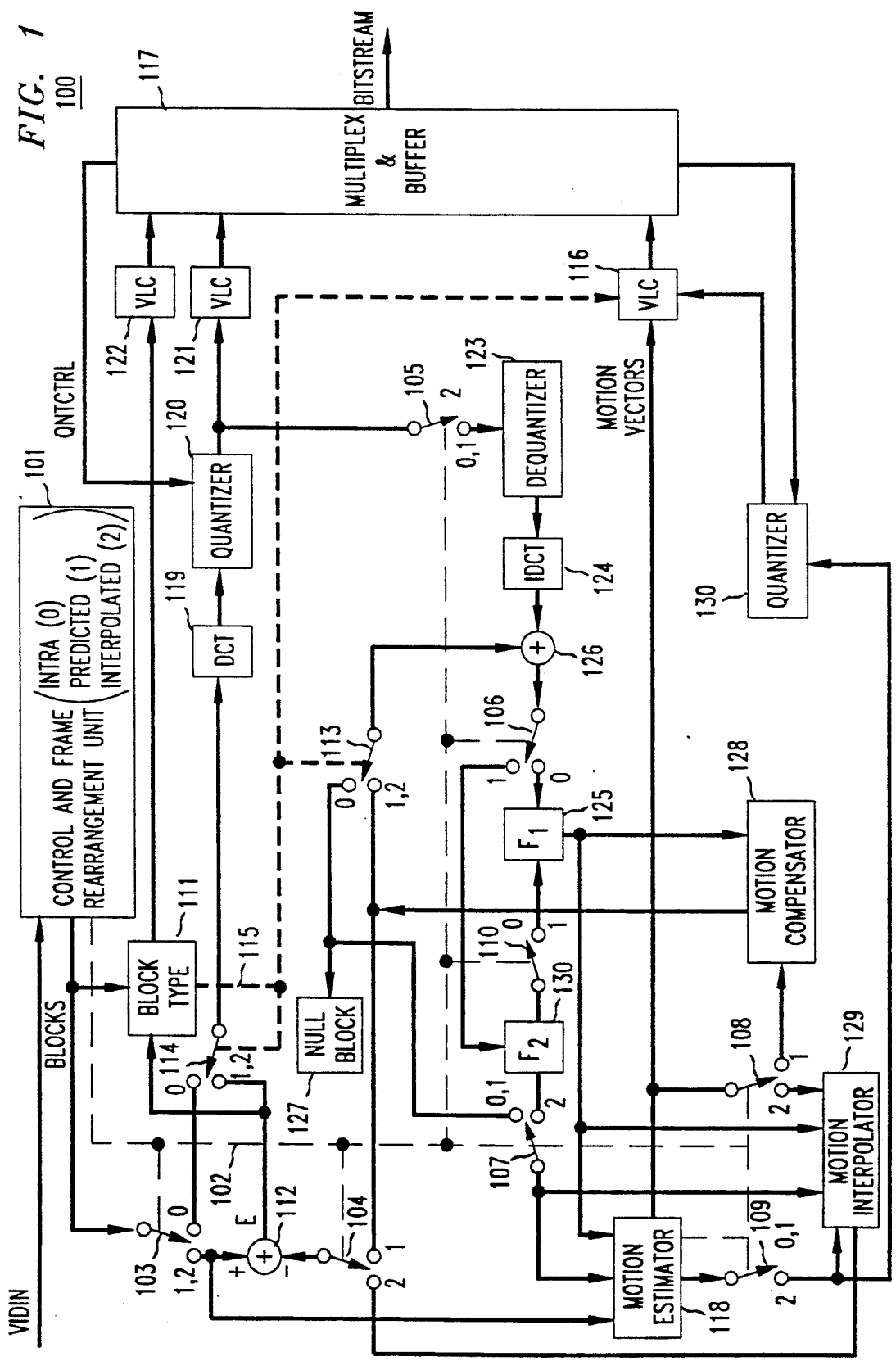

FIG. 1 shows, in simplified block diagram form, exemplary transform video coder 100 for encoding a sequence of image frames (frames) represented in digital form, signal VIDIN, in accordance with aspects of the invention. One aspect of the simplification, for clarity of exposition purposes, is that storage elements which may be embedded in each element shown that are required for computation or sequencing and coordination purposes are not shown. However, use of such storage elements will be readily apparent to one skilled in the art. Also, an overall timing and sequencing controller is not shown. Again, the use of such a timing and sequencing controller will be readily apparent to one skilled in the art.

Transform video coder 100 supplies as an output an encoded digital data signal, BITSTREAM, that is representative of the frames of signal VIDIN with which it was supplied as an input. Each frame so supplied can be encoded by transform video coder 100 via one of three (3) coding methods: intraframe coding, motion predicted coding and motion predicted interpolated coding. Signal VIDIN is supplied as an input to control and frame rearrangement unit 101. Control and frame rearrangement unit 101 controls the overall operations of video coder 100 by determining via which method a frame should be encoded based on the temporal position of the frame. For purposes of this example, the type of encoding for any particular frame is indicated as follows: a zero (0) indicates to encode the frame with intraframe coding, a one (1) indicates to encode the frame with motion compensated prediction coding and a two (2) indicates to encode the frame with multiple frame motion interpolated coding in accordance with an aspect of the invention. Intraframe and motion compensated prediction coding are well known.

Control and frame rearrangement unit 101 temporarily stores a predetermined number of frames of signal VIDIN so that the frames can be supplied as output in a different temporal order than that in which they were received. Each frame, the structure of which is a lattice of pels each of which has a particular location, is divided into Q×R blocks of pels. These pel blocks are supplied in a predetermined order as signal BLOCKS. Such a resequencing is employed so that the at least two reference frames which are required for motion estimation and interpolation can be processed prior to the processing of any frames which are to be motion interpolated encoded. The encoding type determined by control and frame rearrangement unit 101 is conveyed over first control bus 102 to switch elements 103 through 110. Block type unit 111 decides on a block by block basis whether a block of pels should be intraframe encoded despite the fact that the frame to which it belongs is designated to be either motion compensated predicted or motion interpolated encoded based on the temporal position of the frame in video signal VIDIN by control and frame rearrangement unit 101. Such a decision is based on block type unit 111 determining that intraframe encoding would require less bits to represent the block than the other types of encoding. To this end block type unit 111 is supplied with signal BLOCKS and the error of a reconstructed motion compensated predicted or motion interpolated version of the block with respect to the actual block, signal E, supplied by subtracter 112. Block type unit 111 controls switch elements 113 and 114 by sending commands over second control bus 115. In addition, variable length coder 116 is responsive to commands from block type unit 111 to suppress the supplying of motion vectors or weights to multiplex and buffer unit 117.

Any element of transform video coder 100 which does not receive during the processing of block any input that is required to generate its associated output is considered to have no operation during the processing of that block. Such inputs may not be received because of the position of one or more of switch elements 102 through 109 and switch elements 113 and 114.

For clarity of exposition purposes it is assumed that signal VIDIN is first being received after initialization of transform video coder 100 or that transform video coder 100 sends a new base frame encoded via intraframe coding at predetermined intervals and is presently so doing. When operating in intraframe coding mode each of switch element 103 through 110 and switch elements 113 and 114 has their arm positioned to connect to the terminal having at least a zero (0) in its associated label or if the switch has no terminal with at least a zero (0) in its associated label the position of the switch is irrelevant. Signal BLOCKS passes from control and frame rearrangement unit 101 through switch element 103 and 114 to discrete cosine transform unit (DCT) 119. The Q×R blocks of pels are then converted from the pel domain to the Discrete Cosine Transform domain by DCT 119. DCT 119 produces and supplies as an output a set of frequency coefficients that are grouped into 2-dimensional blocks of the same size as the blocks received as input. The transform coefficients supplied as an output by DCT 119 are then supplied to quantizer 120. A quantizer reduces the number of levels available for coefficients to assume. The quantizing can optionally be made responsive to the quantity of information stored in multiplex and buffer unit 117 via signal QNTCTRL. Quantized coefficients supplied as an output from quantizer 120 are in turn supplied as an input to variable length coder (VLC) 121 for encoding. Variable length coding is well known and the choice of coding methodology is at the implementor's discretion. The encoded representation of the quantized coefficients is supplied as an output to multiplex and buffer unit 117. Multiplex and buffer unit 117 subsequently supplies the encoded representation of the quantized coefficients in multiplexed fashion with the outputs of variable length coders 116 and 122 as signal BITSTREAM which may be transmitted or stored, depending on the application.

The quantized coefficients supplied as an output from quantizer 120 are also supplied as an input to dequantizer 123 through switch element 105. Dequantizer 123 performs an inverse quantization on the quantized coefficients thereby generating reconstructed coefficients which are supplied to inverse discrete transform unit (IDCT) 124 to generate a reconstructed version of the block in the pel domain. This reconstructed block is supplied to and stored in frame buffer (F1) 125 through adder 126 and switch 106. Adder 126 is supplied with a null (all zero) block from null block 127. This first frame stored in frame buffer 125 becomes a reference frame in the past ($I_m$) for frames to be predicted or interpolated.

Upon conclusion of processing of the first frame, control and frame rearrangement unit 101 supplies as output signal BLOCKS Q×R blocks of a second frame ($I_p$), in the future relative to the first frame and all frames to be motion interpolated until a new base time period is selected. Additionally, under the control of control and frame rearrangement unit 101 over first control bus 102 each of switch elements 103 through 110 has their arm positioned to connect to the terminal having at least a one (1) in its associated label or if the switch has no terminal with at least a one in its label the position of the switch is irrelevant. For clarity of exposition it is assumed that all blocks in the second frame are to be motion compensated predicted and that block type unit 111 configures the arm positions of switch elements 113 and 114 accordingly to the terminal having at least a one (1) in its associated label.

Each Q×R block of pels of signal BLOCKS is supplied as input to both motion estimator 118 and subtracter 112. Motion estimator 118 receives the reconstructed version of the first frame from frame buffer (F1) 125 and a null block from null block 127 to derive and supply as outputs a motion vector, i.e., a displacement relative to the location of the block which identifies the location of a same size block in reference frame $I_m$ that best matches the block. The motion vectors for each of the blocks are supplied to motion compensator 128 via switch element 108 and to variable length coder (VLC) 116 for encoding prior to being incorporated into BIT STREAM by multiplex and buffer unit 117. Motion compensator 128 also receives the prior reconstructed frame currently stored in frame buffer (F1) 125 and generates a predicted version of the block in the current frame which is supplied through switch element 104 to subtracter 112. Subtracter 112 subtracts the predicted version of the current block from the actual current block and generates error signal E which is supplied through switch element 114 to DCT 119. DCT 119 transforms the error signal into the Discrete Cosine Transform domain and the resulting transformed error signal is supplied to and quantized by quantizer 120. The quantized transformed error signal supplied as an output from quantizer 120 are supplied as an input to variable length coder (VLC) 121 for encoding. The encoded representation of the quantized transformed error signal is supplied as an output to multiplex and buffer unit 117.

The quantized transformed error signal supplied as an output from quantizer 120 are also supplied as an input to dequantizer 123 through switch element 105. Dequantizer 123 performs an inverse quantization on the quantized transformed error signal thereby generating reconstructed coefficients which are supplied to inverse discrete transform unit (IDCT) 124 which generates a reconstructed version of the error signal in the pel domain. The reconstructed version of the error signal in the pel domain is added by adder 126 to the motion predicted version of the block in the current frame received via switch element 113 to form the corrected predicted current block which very closely corresponds to the current block. This corrected predicted current block is supplied via switch 106 to frame buffer (F2) 130 and stored therein. The blocks which correspond to the current frame are accumulated in frame buffer 130 and become a reference frame in the future ($I_p$) for frames to be interpolated. The variable length encoded motion vectors and the variable length encoded quantized transformed error signals are then multiplexed together into signal BITSTREAM by multiplex and buffer unit 117 which may be transmitted or stored depending upon the application. Signal BITSTREAM can be employed by a corresponding decoder to reconstruct a representation of the original frame.

Subsequent frames, the Q×R blocks of which are supplied as signal BLOCKS by control and frame rearrangement unit 101 are to be motion interpolated until a frame that exists at a later time than the second frame which was motion compensated predicted is to be encoded. Under the control of control and frame rearrangement unit 101 over first control bus 102 each of switch elements 102 through 110 has their arm positioned to connect to the terminal having at least a two (2) in its associated label or if the switch has no terminal with a two in its label the position of the switch is irrelevant. For clarity of exposition it is assumed that all blocks in the subsequent frames are to be motion interpolated and that block type unit 111 configures the arm positions of switch elements 113 and 114 accordingly to the terminal having at least a two (2) in its associated label.

Each Q×R block of pels of signal BLOCKS is supplied as input to both motion estimator 118 and subtracter 112. Motion estimator 118 receives a reconstructed version of the first (past) frame from frame buffer (F1) 125 and a reconstructed version of the second (future) frame from frame buffer (F2) 130. In accordance with an aspect of the invention, motion estimator 118 derives and supplies as an output a set of motion vectors, i.e., a set of displacements $d_m$, $d_p$ within a predetermined area of the location of the block wherein $d_m$ points to a same size block in the reference frame in the past $I_m$ and $d_p$ points to a same size block in the reference frame in the future $I_p$ such that a weighted sum of the values of the pels of the blocks pointed to by the displacements best approximates the block to be encoded. The motion vectors are supplied to motion interpolator 129 via switch element 108 and to variable length coder (VLC) 116 for encoding prior to being incorporated into signal BITSTREAM by multiplex and buffer unit 117. Motion estimator 118 also supplies as an output to motion interpolator 129, in accordance with an aspect of the invention, a set of weighting values (weights) $a_m$, $a_p$ for the values of the pels of the blocks pointed to by each of the motion vectors for the block, one weight corresponding with each of the motion vectors. Motion interpolator 129 receives the prior reconstructed frame currently stored in frame buffer (F1) 125, the reconstructed version of the second (future) frame from frame buffer (F2) 130, the motion vectors via switch element 108 and the weights via switch element 109 to generate a motion interpolated version of the block in the current frame which is supplied through switch element 104 to subtracter 112. The interpolated version of the block in the current frame is derived by multiplying (weighting) the value of the pels of the block pointed to by the motion vector for the first (past) frame by the weight for the past frame and adding that to the value of the pels of the block pointed to by the motion vector for the second (future) frame multiplied by the value of the weight for the future frame. Subtracter 112 subtracts the interpolated version of the current block from the actual current block and generates error signal E which is supplied through switch element 114 to DCT 119. DCT 119 transforms the error signal into the Discrete Cosine Transform domain and the resulting transformed error signal is supplied to and quantized by quantizer 120. The quantized transformed error signal supplied as an output from quantizer 120 is supplied as an input to variable length coder (VLC) 121 for encoding. The encoded representation of the quantized transformed error signal is supplied as an output to multiplex and buffer unit 117. The weights from motion estimator 118 are supplied via switch element 109 to optional quantizer 130 which quantizes the values of the weights and supplies the quantized weight values to variable length coder 116. Multiplex and buffer unit 117 supplies the encoded representation of the quantized transformed error signal in multiplexed fashion with the outputs of variable length coders 116 and 122 as signal BITSTREAM which may be transmitted or stored, depending on the application.

When a block belongs to a frame that control and frame rearrangement unit 101 has determined, based on the time position of the frame, is to be motion compensated predicted or motion interpolated, block type unit 111 may determine that it would require less bits to directly intraframe encode the particular block. This determination is based on a comparison of the complexity of the error signal and the actual block itself, both of which are supplied as inputs to block type unit 111. If block type unit 111 determines that it requires less bits to directly intraframe encode the particular block, switch elements 113 and 114 are instructed via commands sent over second control bus 115 to connect to the terminal having a zero label. In addition, variable length coder 116 is responsive to commands from block type unit 111 to suppress the supplying of motion vectors and weights to multiplex and buffer unit 117. This results in the selected block being intraframe encoded as described above. Block type unit 111 supplies an indication of the type of encoding selected which is encoded by variable length coder 122 and supplied to multiplex and buffer unit 117 where it is appropriately incorporated into signal BITSTREAM and supplied as an output. If the block was to have been motion compensated predicted, a reconstructed version of the block in the pel domain will be generated as described above for blocks of a frame that was to be intraframe encoded. However, the reconstructed version of the block in the pel domain will be stored in frame buffer 130 instead of frame buffer 125 because of the position of switch element 106.

When control and frame rearrangement unit 101 determines that all the frames between the first (past) and second (future) frames have been encoded, switch element 110 is closed and the image frame stored in frame buffer 130, which is the future image frame, is copied into frame buffer 125 to become the new past image frame. Thereafter, a new future frame, further in the future than the old future frame, will be motion compensated predicted and stored in frame buffer F2. Alternatively, two new reference frames could be selected by control and frame rearrangement unit 101, the first of which would be intraframe encoded and stored in frame buffer 125 and the second of which would be motion compensated predicted and stored in the frame buffer 130. The interpolation process would continue thereafter as described above for all frames between the selected reference frames.

Figure 2:
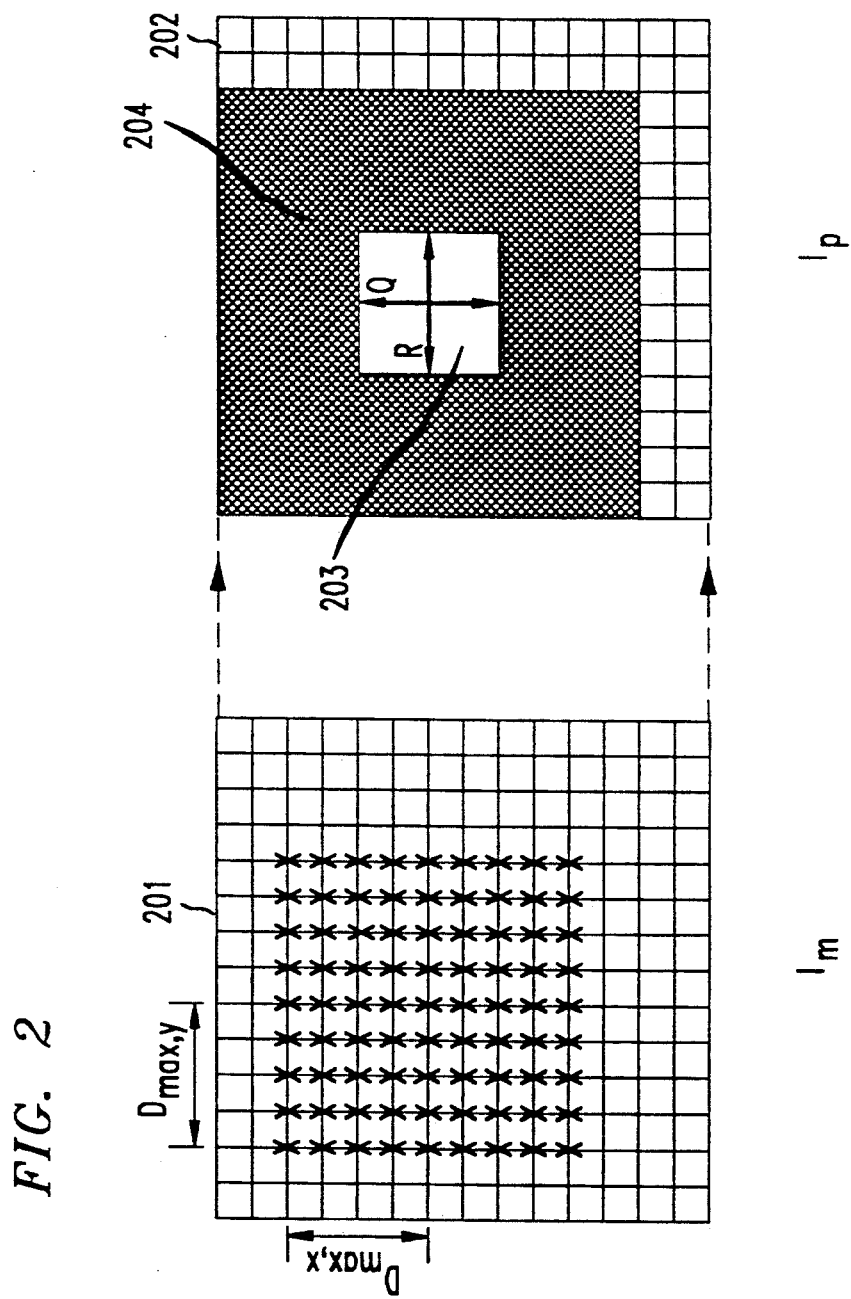
FIG. 2 illustrates aspects of a block-matching search process between two frames.

Shown in FIG. 2 are exemplary sets of pels 201 and 202 from the same representative area of the image lattice of each of frames $I_m$ and $I_p$ from signal VIDIN (FIG. 1). These frames correspond to the first and second frames processed by video coder 100. $I_m$, is a reference frame in the past relative to frame $I_p$ which is to be encoded by motion compensated prediction by video encoder 100. Block of pels 203, a Q×R subset of set of pels 201 is the block for which a search is to be performed. A typical value for each of Q and R is 16. However, for clarity and brevity of exposition, Q and R are shown in FIG. 2 as having a value of 4. A search range, denoted by $D_{max}$, is the maximum individual component of distance (typically in units of pels) in either the horizontal or vertical direction for any displacement that is a candidate to be motion vector. The total search area defined by the search range is graphically depicted via the sum of the gray shaded region 204 and block 203. The total search area is a region which indicates the potential area in which to find each pel of a candidate block to approximate block 203. The locations in previous frame 202 marked by an X defines the set of centers of potential blocks in frame 202 which will be searched for the best possible match to block 203. The distance from the center of block 203 to a location marked by an X in frame 202 corresponds to a displacement which is a candidate to be a motion vector for block 203. For each displacement defined by a center location in previous frame 202 marked by an X the matching function defined in equation (1) is computed. The motion vector corresponds to the displacement d at which the minimum of the matching function is found.

In FIG. 3, the operation of FIG. 2 is generalized to two reference frames, in accordance with an aspect of the invention. Shown are exemplary sets of pels 201, 202 and 301 from the same representative area of frames $I_m$, $I_p$ and $I_n$ of signal VIDIN (FIG. 1). Frame $I_n$ is to be encoded via motion interpolation by video encoder 100. $I_m$, is a reference frame in the past relative to frame $I_n$ and $I_p$ is a reference frame in the future relative to frame $I_n$. Block of pels 302, a $Q \times R$ subset of set of pels 301 is the block to be encoded for which a search for motion vectors and corresponding weights is to be performed. Although the reference frames are typically arranged such that one is in the past $I_m$ and one is in the future $I_p$ relative to frame $I_n$ which is to be encoded by motion interpolation, as shown in FIG. 3 by representative sets of pels 201, 202 and 301, at the implementor's discretion, both reference frames ($I_m$ and $I_p$) may be in the past relative to frame $I_n$.

To determine the motion vectors and weights for block 302, the displacements pointing to a block of pels in each of frames $I_m$ and $I_p$ must be found by motion estimator 118 (FIG. 1) such that the weighted combination of values of the pels comprising the blocks pointed to the energy of the error signal (E) is minimized. Such minimum is expressed by $$\min_{\alpha_m, \alpha_p, d_m, d_p} \sum_{x' \in N(x)} E^2(x') \quad (2)$$

where $$E(x') = I_n(x') - (\alpha_m I_m(x' + d_m) + \alpha_p I_p(x' + d_p)) \quad (3)$$

is the error for $d_m \in D_m$ and $d_p \in D_p$. Respectively, $d_m$ and $d_p$ are, the displacements for frame $I_m$ and $I_p$. A candidate pair of values for $d_m$ and $d_p$ are graphically depicted in FIG. 3 as vectors 303 and 304, respectively. Also, $D_m$ and $D_p$ correspond to the search ranges respectively in frames frame $I_m$ and $I_p$. In FIG. 3 the search areas defined by $D_m$ and $D_p$ are respectively graphically illustrated by shaded regions 305 and 306. $\alpha_m$ and $\alpha_p$ are the weighting factors accorded to each pel value of the respective blocks to be combined from frames 201 and 202.

In accordance with an aspect of the invention, the determination of optimum displacements and weights is achieved by imposing that the partial derivatives of $$\sum_{x' \in N(x)}$$

$E^2(x')$ with respect to $\alpha_m$ and $\alpha_p$ equal zero. This leads to the following system of 2 linear equations $$M \cdot u = v \quad (4)$$

where vectors u and v are given by $$u = \begin{bmatrix} \alpha_p \\ \alpha_m \end{bmatrix} \quad (5)$$

$$v = \begin{bmatrix} \sum_{x' \in N(x)} I_m(x' + d_m) I_n(x') \\ \sum_{x' \in N(x)} I_n(x') I_p(x' + d_p) \end{bmatrix} \quad (6)$$

and where matrix M is given by $$M = \begin{bmatrix} \sum_{x' \in N(x)} I_m^2(x' + d_m) & \sum_{x' \in N(x)} I_m(x' + d_m) I_p(x' + d_p) \\ \sum_{x' \in N(x)} I_m(x' + d_m) I_p(x' + d_p) & \sum_{x' \in N(x)} I_p^2(x' + d_p) \end{bmatrix}$$

Matrix M can be shown to be definite and positive for all values of x, $d_m$ and $d_p$ thereby guaranteeing that the corresponding optimal values of the weights, $u^* = \alpha_m^*$, $\alpha_p^*$, as evaluated for any pair $d_m$, $d_p$ will lead to a minimum of the E energy for that particular $d_m$, $d_p$ pair. Singular values of M result in an infinite set of values $\alpha_m^*$ and $\alpha_p^*$ that satisfy equation (2). Such degenerate cases occur, for example, when there exists a perfect match (no error) in both $I_m(x)$ and $I_p(x)$. For such degenerate cases any arbitrary value may be chosen as the optimum value for one of the weights and the optimum value for the remaining weight is determined by solving either of the two linear equations represented by equation (4). In non-degenerate cases, the optimal solution for the set of weights $u^*$ is given by $$u^* = M^{-1} \cdot v \quad (8)$$

Prior to the substitution of actual values, ideal weights are functions dependent on the displacement pair $d_m$, $d_p$. Therefore, the optimum solution requires, in accordance with an aspect of the invention, the selection of an pair $d_m$, $d_p$ that satisfies equation (4) and has the lowest E energy.

To find such an optimum pair $d_m$, $d_p$, in accordance with an aspect of the invention, requires a search among a set of candidate displacement pairs. Typically, all the pairs of displacements that are confined within the search range are included in the set of candidate displacement pairs. For each member of set of candidate displacement pairs matrices M, $M^{-1}$ and vector v are evaluated so that equation (8) is yields particular values for $u^*$. The values of $u^*$ and their corresponding displacement pair $d_m$, $d_p$ are then employed, in accordance with an aspect of the invention, to compute the energy of E. The n-tuple ($\alpha_m^*$, $\alpha_p^*$, $d_m$, $d_p$) of a particular displacement pair is stored if it yields a smaller value of the E energy than any other displacement pair already evaluated has yielded. The E energy of the stored n-tuple is also stored so that as the E energy of each subsequent n-tuple is evaluated it can be compared with the E energy of the stored n-tuple. The n-tuple that remains stored when all the candidate pairs of displacements have been evaluated is comprised of the optimum weights and displacements for the block being encoded. These are supplied by motion estimator 118 (FIG. 1) as the weights and motion vectors for block 302 in accordance with an aspect of the invention. It will be apparent, to one skilled in the art that other measures of the aggregate error signal can be used instead of energy without affecting the scope of the invention. One such alternate measure is an absolute value type of function.

At the discretion of the implementor, and in accordance with an aspect of the invention, several methods may be employed to simplify and/or speed up the search process. One such method, in accordance with an aspect of the invention, is to interrupt the search procedure and utilize a particular $d_m$, $d_p$ whenever the energy of the E signal gets below a predetermined threshold T. This method finds a value of the energy of the E signal which, although perhaps not the absolute minimum, is acceptably small and yet tends to limit the number displacement pairs $d_m$, $d_p$ that must be checked. This is because once an acceptably small value for the energy of E is obtained, none of the remaining candidate displacement pairs $d_m$, $d_p$ need be checked. The speed at which a search that employs a threshold finds a displacement pair that satisfies the threshold may be further increased by controlling the order in which the candidate pairs are evaluated. The selection of which displacement pairs become members of the set of candidate pairs can also be controlled so as to limit the number of candidate pairs to be evaluated. Candidate pairs may be added or removed from the set of candidate pairs depending on the results of prior candidate pair evaluations. Control of the selection of the displacement pairs can also be combined with a threshold criterion.

One exemplary method limits the process of searching for the optimum weights and displacements by controlling the candidate pairs which are added to and removed from the set of candidate pairs relies on the fact that the energy of E decreases monotonically as the displacement moves away from the direction of minimum distortion. Shown in FIG. 4 is exemplary sets of pels 201, 202 and 301 from the same areas of frames $I_m$, $I_p$ and $I_n$. Block 401 corresponds to the block of interest as it is situated in the lattice of frame $I_n$ which is to be interpolated. In conjunction with FIG. 4, the following exemplary sequence of steps may be employed to search for an acceptable pair of displacements for use as motion vectors in accordance with an aspect of the invention. Each displacement is defined with respect to a location relative to a coordinate origin pointed to by x. In this example, origin 402 indicated by a cross is at the center of block 401 which is to be encoded.

All displacements corresponding to the null (0,0) displacement and those defined by predetermined locations in each of frames $I_m$ and $I_p$ that are substantially equidistant from x, e.g., the center of block 401, by approximately one quarter of the distance of the total search area are selected as a set of initial candidate displacements. For example, in each of sets of pels 201 and 202 select null displacement 403. Also select the 8 displacements defined by locations around the center of block 401 that are distant by the largest integer value smaller than one half the component wise maximum displacement $D_m$ and $D_p$ respectively, e.g., 3 for $D_m = D_p = 7$. The total set of locations 404 selected are marked in FIG. 4 by at least an X. Thereafter, a set of pairs defined by the pairwise combination of all such selected displacements having one displacement defined by a location in frame $I_m$ and one displacement defined by a location in frame $I_p$ is determined. For this example, 81 candidate pairs of displacements will be members of the set of pairs. The minimum E energy is computed for each candidate pair of the set of pairs. The displacement pair with the minimum E energy defined by the pair of locations 405 is designated $d_m^{(0)}$ and $d_p^{(0)}$. This selected displacement pair, has one displacement defined by a location in frame $I_m$ and a second displacement defined by a location in frame $I_p$. The pair of locations 405 defining $d_m^{(0)}$ and $d_p^{(0)}$ are marked by both an X and a filled square in each of set of pels 201 and 202.

Next, any members of the set of candidate displacements are removed and the displacements defined by locations 405, i.e., $d_m^{(0)}$ and $d_p^{(0)}$, and those displacements defined by predetermined locations in each of frames $I_m$ and $I_p$ that are substantially equidistant from each location of set of locations 405 by approximately one eighth of the distance of the total search area are selected as a new set of candidate displacements. For example, in each of sets of pels 201 and 202 select $d_m^{(0)}$ and $d_p^{(0)}$ and the 8 displacements defined by locations around locations 405 that are distant by the largest integer value smaller than one quarter the component wise maximum displacement $D_m$ and $D_p$ respectively, e.g., 2 for $D_m = D_p = 7$. The total set of locations 406 selected are marked in FIG. 4 by at least a filled square. Thereafter, a second set of pairs defined by the pairwise combination of all such selected displacements having one displacement defined by a location in frame $I_m$ and one displacement defined by a location in frame $I_p$ is determined. For this example, again, 81 candidate pairs of displacements will be members of this second set of pairs. The minimum E energy is computed for each candidate pair of the second set of pairs. The pair with the minimum E energy 407 is designated $d_m^{(1)}$, $d_p^{(1)}$. This selected displacement pair, has one displacement defined by a location in frame $I_m$ and a second displacement defined by a location in frame $I_p$. The defining point of each displacement of the selected displacement pair with minimum E energy 407 is marked by both a filled square and a circle in each of set of pels 201 and 202.

Finally, any members of the set of candidate displacements are again removed the displacements defined by locations 407, i.e., $d_m^{(1)}$ and $d_p^{(1)}$, and those displacements defined by predetermined locations in each of frames $I_m$ and $I_p$ that are substantially equidistant from each location of set of locations 407 by approximately one sixteenth of the distance of the total search area are selected as the final set of candidate displacements. For example, in each of sets of pels 201 and 202 select $d_m^{(1)}$ and $d_p^{(1)}$ and the 8 displacements defined by locations around locations 407 that are distant by the largest integer value smaller than one eighth the component wise maximum displacement $d_m^{(1)}$ and $d_p^{(1)}$ respectively, e.g., 1 for $D_m = D_p = 7$. The total set of locations 408 selected are marked in FIG. 4 by at least a circle. Thereafter, a third set of pairs defined by the pairwise combination of all such selected displacements having one displacement defined by a location in frame $I_m$ and one displacement defined by a location in frame $I_p$ is determined. For this example, again, 81 candidate pairs of displacements will be members of this third set of pairs. The minimum E energy is computed for each candidate pair of the third set of pairs. The pair with the minimum E energy 409 is designated $d_m^{(2)}$, $d_p^{(2)}$. This selected displacement pair, has one displacement defined by a location in frame $I_m$ and a second displacement defined by a location in frame $I_p$. The defining point of each displacement of the selected displacement pair with minimum E energy 409 is marked by both a filled circle in each of set of pels 201 and 202. This selected displacement pair, having one displacement defined by a location in frame $I_m$ and a second displacement defined by a location in frame $I_p$ is selected as the motion vectors for block 402. In addition, in accordance with an aspect of the invention, it may be determined to terminate this procedure for searching for a displacement pair to use as a motion vector whenever the E energy becomes equal to or less than a threshold value T. The displacement pair which first to achieves an E energy less than T is chosen as the motion vectors. Of course additional search steps could be added, as will be understood by one skilled in the art, depending upon the block size chosen and the error margin acceptable to the implementor.

Another exemplary method for reducing the number candidate displacement pairs that need be checked to find a pair of motion vectors and their corresponding weights employs information concerning spatially neighboring blocks and individual pels, in accordance with an aspect of the invention, for arranging the displacement pairs that are members of the set of displacement candidates. The arrangement strategy is based on the generally true proposition that all blocks in a particular area of a frame are likely to be part of a single object which is moving. Therefore, all the blocks of which the object is comprised are initially presumed moving in a substantially uniform manner from frame to frame. Shown in FIG. 5 is a portion of a frame $I_n$ to be encoded by video coder 100 (FIG. 1) as it is divided into blocks of pels by control and frame rearrangement unit 101. Blocks of pels 501 and 502 are located at $x_{(01)}$ and $x_{(10)}$ in frame $I_n$ which are located, respectively, to the left and above block 503 located at $x_{(00)}$ and which is currently to be encoded. The optimal set of displacement pairs, i.e., the motion vectors, are denoted for blocks 501 and 502 by $A=(d_m^{(01)}, d_p^{(01)})$ and $B=(d_m^{(10)}, d_p^{(10)})$, respectively. In accordance with the assumption that for a sequence of images of natural scenes the motion field is smooth, an initial displacement pair, either A or B, is chosen for block 503, denoted by $C=(d_m^{(00)}, d_p^{(00)})$. The choice of which initial displacement pair A or B to assign to C is made by determining which pair will have minimum E energy and assigning the determined pair. The estimation of the motion of block 503 represented in the displacement pair assigned as the motion vector may be further improved by searching through additional pairs of candidate displacements. A searching method with a threshold strategy is employed so that all candidate displacement pairs within the search range having one displacement in each of frames $I_m$ and $I_p$ are scanned such that the motion vectors selected are a displacement pair having the lowest E energy for values of the displacements close to the values of C.

A further exemplary search limitation method employs an approach that alternately switches the frame being searched for a motion vector between reference frames $I_m$ and $I_p$, i.e., when $d_m$ is fixed, $d_p$ is changed, and vice-versa. Such a method is termed a ping-pong search. The reference frame that is chosen to be fixed initially is the one temporally closest to frame $I_n$, the frame to be motion interpolated encoded, as there is more confidence in its neighboring block initial estimate. One of two scanning orders may be employed. For clarity of exposition purposes, the initial displacements selected as C are renamed $d_{m,0}$ and $d_{p,0}$, i.e. $d_{m,0}=d_m^{(00)}$ and $d_{p,0}=d_p^{(00)}$.

Shown in FIG. 6 are blocks of pels 601 and 602 for w exemplary stages of a ping-pong search where w is a variable that changes from block to block. Block of pels 601 in frame $I_m$ and block of pels 602 in $I_p$ correspond in location to block of pels 503 of frame $I_n$. Displacement pair 603 is initially assigned to C. For ease of exposition, it is assumed that $d_p$ is initially fixed. All values of displacements $d_m$ that are combined in a pair with $d_{p,0}$ are scanned in a circular fashion around $d_{m,0}$. The order in which candidate displacements are selected for the exemplary search, depicted in FIG. 6, is indicated by the numbers associated with each point corresponding to each possible value of $d_m$. Whether a counter-clockwise or clockwise direction is selected is arbitrarily decided. As soon as the E energy is less than a predetermined threshold T, the search process is stopped and the current candidate $d_m$ and $d_p$ are employed as the motion vectors for block 603. In the event that all values of $d_m$ have been scanned without an E energy of less than T being found, the value of $d_m$ leading to the minimum of the E energy is fixed in frame $I_m$ and called $d_{m,1}$. Scanning is continued, in a similar circular fashion, for displacements $d_p$ in frame $I_p$ around $d_{p,1}$. This ping-pong procedure is iterated until the E energy falls below T or it ceases to decrease. In the switching between frames $I_m$ and $I_p$, the E energy is monotonically decreasing, which ensures that the search will converge.

To further speed up the search for displacements to employ as motion vectors, instead of searching all values of $d_m$ that are combined in a pair with $d_{p,j}$ or all values of $d_p$ that are combined in a pair with $d_{m,j}$ a selected subset of the displacements that are within the possible search range of each of frames $I_m$ and $I_p$. Index j indicates the number of times each of frames $I_m$ and $I_p$ has been visited. The subset is selected so as to comprise those displacements that are close in location to the current displacement of the frame for which the displacement is not fixed. For example, if it is decided to only scan the eight closest neighbors to $d_{m,j}$ and $d_{m,j}$ itself when $d_{p,j}$ is fixed, then the value of $d_m$ referred to $d_{m,j+1}$ that minimizes the E energy over the 9 possible pairs is kept constant while proceeding on to frame $I_p$ in a ping-pong fashion similar to that described above.

The well known concept of conjugate direction search is extended, in accordance with an aspect of the invention, as another method for increasing the speed of the search of candidate displacements by determining the order in which members of the set of candidate displacements are searched in the finding of motion vectors. For purposes of this example, all the pairs of displacements that are confined within the search range are included in the set of candidate displacement pairs. Shown in FIG. 8, in flow chart form, is an exemplary implementation of the extended conjugate direction search. The routine is executed by motion interpolator 129 (FIG. 1) and it is entered via step 801 when a set of displacements to be used as motion vectors is needed for a block. In step 802 $S_{min}$, the current minimum energy of E, is initialized to infinity. Next, in step 803 the displacement with respect to a first reference frame, in this example frame $I_m$, is defined to have the same row value as the initial displacement selected for C as defined above and whose column value is set to the leftmost column displacement defined by a search range $D_{max}$.

For purposes of this example, $D_m = D_p = D_{max}$ and $D_{max}$ has row component $D_{max,x}$ and column component $D_{max,y}$. Additionally, row flag mx—flag is set to be a one. Similarly, in step 804, the displacement with respect to a second reference frame, in this example frame $I_p$, is defined to have the same row value as the initial displacement selected for C and whose column value is set to the leftmost column displacement defined by the search range $D_{max}$. Also, row flag px—flag is set to be a one. It is recognized that the rightmost and leftmost directions can be uniformly interchanged for purposes of the search. Similarly, the upmost and downmost directions can be uniformly interchanged for purposes of the search. Additionally, row and column order can be uniformly interchanged for purposes of the search. The directions in this example were selected for convenience purposes only. In step 805 the energy of E is computed for the current pair of displacement values and is denoted a S. Next, conditional branch point 806 tests if S is less than $S_{min}$. If the test result in step 806 is YES, control is passed to step 807 which set the following values: change—min, a flag indicating that $S_{min}$ has been changed is set to 1; $d_{m,min}$, a variable that contains the current estimate of the displacement in frame $I_m$, is set to $d_m$; $d_{p,min}$, a variable that contains the current estimate of the displacement in frame $I_p$, is set to $d_p$; and $S_{min}$ is set to the current value of S. Control is then passed to conditional branch point 808. If the test result in step 806 is NO, control is passed directly to step 808. Conditional branch point 808 tests if px—flag is set to 1. If the test result in step 808 is NO, control is passed to conditional branch point 809 which tests if $d_{p,x}$ is equal to the downmost row value $D_{max,x}$. If the test result in step 809 is NO, control is passed to step 810 which increments the row value of displacement $d_p$. Control is then passed back to step 805 to determine and test the new values of S. If the test result in step 809 is YES, control is passed to conditional branch point 811 which tests if flag change—min is set to one. If the test result in step 811 is YES, control is passed to step 812 which sets the new $d_p$ estimate to the row displacement found to have the minimum S and the leftmost column displacement. Additionally, flag change—min is set to zero (0) and px—flag is set to 1. Then control is passed back to step 805.

If the test result in step 808 is YES, control is passed to step 813 which tests if $d_{p,y}$ is equal to the rightmost column displacement. If the test result in step 813 is NO, control is passed to step 814 which increments the column value of displacement $d_p$. Control is then passed back to step 805 to determine and test the new values of S. If the test result in step 813 is YES, control is passed to step 815 which tests if flag change—min is set to 1. If the test result in step 815 is YES, control is passed to step 816 which sets the new $d_p$ estimate to the column displacement found to have the minimum S and the topmost row displacement. Additionally, flag change—min is set to zero (0) and px—flag is set to zero (0). Then control is passed back to step 805.

If the test results in steps 811 or 815 were NO, control is then passed to conditional branch point 817. Conditional branch point 817 tests if mx—flag is set to 1. If the test result in step 817 is NO, control is passed to conditional branch point 818 which tests if $d_{m,x}$ is equal to the downmost row value $D_{max,x}$. If the test result in step 818 is NO, control is passed to step 819 which increments the row value of displacement $d_m$. Control is then passed back to step 805 to determine and test the new values of S. If the test result in step 818 is YES, control is passed to conditional branch point 820 which tests if flag change—min is set to one. If the test result in step 820 is YES, control is passed to step 821 which sets the new $d_m$ estimate to the row displacement found to have the minimum S and the leftmost column displacement. Additionally, flag change—min is set to zero (0) and mx—flag is set to 1. Then control is passed back to step 805.

If the test result in step 817 is YES, control is passed to step 822 which tests if $d_{m,y}$ is equal to the rightmost column displacement. If the test result in step 822 is NO, control is passed to step 823 which increments the column value of displacement $d_m$. Control is then passed back to step 805 to determine and test the new values of S. If the test result in step 822 is YES, control is passed to step 824 which tests if flag change—min is set to 1. If the test result in step 824 is YES, control is passed to step 825 which sets the new $d_m$ estimate to the column displacement found to have the minimum S and the topmost row displacement. Additionally, flag change—min is set to zero (0) and mx—flag is set to zero (0). Then control is passed back to step 805. If the test results in steps 820 or 824 were NO the current values of displacements $d_{m,min}$ and $d_{p,min}$ are returned via step 826. Thereafter, the routine is exited via step 827.

As an alternative, a limited set of displacements, for example 3 or 5, could be compared in each direction, rather than $[2|D_m|+1]^2$, $[2|D_p|+1]^2$ respectively for each frame.

In practice, an object present in the interpolated frame $I_n$ always exists in at least one of reference frames $I_m$ or $I_p$. Therefore, the distribution of $(\alpha_m, \alpha_p)$ is such that $$\alpha_m + \alpha_p = 1. \tag{9}$$

The optimal solution to equation (2), can be expressed by $$\alpha_m = \frac{\sum_{x' \in N(x)} I_n(x') - I_p(x' + d_p)}{\sum_{x' \in N(x)} I_m(x' + d_m) - \sum_{x' \in N(x)} I_p(x' + d_p)} \tag{10}$$

as long as $$\sum_{x' \in N(x)}$$

$I_m(x'+d_m) - I_p(x'+d_p) \neq 0$. Similarly, since most objects in a scene move with a constant velocity, it is most likely that as long as a reference for objects in frame $I_n$ exists in both frames $I_m$ and $I_p$, the following constraint can be imposed:

$$d_m = (n-m)/(n-p)d_p \tag{11}$$

where m, n and p are the frame numbers of the reference frame in the past, the frame to be encoded and the reference frame in the future. In such a case, the number of possible pair of displacements to consider is reduced from $([2|D_m|+1]^2[2|D_p|+1]^2)$ to $[2\max(|D_m|,|D_p|)+1]^2$ only, assuming that sub-pixel accuracy is not required.

For any arbitrary pair of displacements $d_m$, $d_p$, no matter how they have been derived, the pair of weights $a_m$, $a_p$ that yields the minimal E energy for that pair can be obtained by solving equation (8).

Once an n-tuple $(a_m^*, a_p^*, d_m, d_p)$ with acceptably low E energy has been determined, it may be desirable to quantize the weights $a_m^*$, $a_p^*$ and thereby limit the bandwidth required for their transmission. It is usually preferable to minimize the increment of the E energy that results when any pair $a_m$, $a_p$ is quantized to a different pair $a_m^{(q)}$, $a_p^{(q)}$. By setting a limit on the acceptable increase in the E energy due to quantization, an appropriate step size can be chosen.

By introducing a change in value to the weights $\Delta a_m$, $\Delta a_p$ the E energy increase $\Delta$ that is derived via a differential analysis of the expression of the E energy is given by $$\Delta = m_{11}(\Delta a_m)^2 + m_{22}(\Delta a_p)^2 + 2m_{12}(\Delta a_m)(\Delta a_p) \tag{12}$$

where $m_{11}$ and $m_{22}$ are the diagonal elements of matrix M, and $m_{12}$ is the anti-diagonal element of matrix M. It is important to notice that equation (12) does not contain any values taken from frame $I_n$. This ensures that a decoder can estimate the quantization step sizes for $a_m$ and $a_p$ directly from a reconstruction of frames $I_m$ and $I_p$ as long the maximum acceptable E energy increase due to quantization $\Delta_{max}$ is known.

For non-degenerate cases ($|M| \neq 0$), it is possible to choose a quantization step size for $a_m$, $a_p$ that maintains $\Delta$ below a threshold $\Delta_{max}$. This is achieved by solving for $\Delta a_m$, $\Delta a_p$ in equation (12). The resulting quantization step sizes must be maintained smaller than $$\Delta a_m = \frac{m_{22}}{m_{11}} \Delta a_p \tag{13}$$

$$\Delta a_p = \sqrt{m_{11} \Delta_{max}/|M|} . \tag{14}$$

Where the constraint of equation (9) is imposed, the maximum step size for $\Delta a_m$ is given by $\Delta a = \sqrt{\Delta_{max}/(m_{11}+m_{22}-2m_{12})}$. It has been observed experimentally that the constraint imposed by equation (9) on the weight values causes the E energy to be much less sensitive to the quantization of $a_m$, $a_p$. Without employing the constraint of equation (9), larger step sizes for $\Delta a_m$ and $\Delta a_p$ are required due to the large values of $m_{11}$ or $m_{22}$.

Shown in FIG. 10, in flow chart form, is a simplified composite, in accordance with an aspect of the invention, of the steps required of motion estimator 118 (FIG. 1) to generate motion vectors and weights for a block to be encoded. Accordingly the routine is entered in step 1001 when it is determined that motion vectors and weights are to be generated. Thereafter, in step 1003 the current value stored for the error energy $E_{stored}$, is initialized to infinity. In step 1005 candidate displacements are determined for each reference frame. Step 1007 groups the candidate displacements into a set of groups $d_m, d_p$. The next $d_m$, $d_p$ group to be processed is obtained from the set of groups. In step 1011 M, $M^{-1}$ and a vector v are evaluated for the $d_m$, $d_p$ group. Step 1013 derives $u^* = M^{-1} \cdot v$ in accordance with an aspect of the invention. The error energy for $a_m^*$, $a_p^*$, $d_m$, $d_p$ is computed in step 1015. Thereafter conditional branch point 1017 tests to determine if the E energy is less than the current value of $E_{stored}$. If the test result in step 1017 is YES control is passed to step 1019 which stores $a_m^*$, $a_p^*$, $d_m$, $d_p$ and sets $E_{stored}$ equal to the current E energy. Control is then passed to step 1021. If the test result in step 1017 is NO, control is passed directly to step 1021. Conditional branch point 1021 tests to determine if $E_{stored}$ is less than threshold T. If the test result in step 1021 is NO control is passed to step 1023 which readjusts the set of $d_m$, $d_p$ groups. This readjustment can be a rearrangement of the order in which the groups are selected in step 1009, the addition or deletion of groups as required for an efficient search. Control is then passed to step 1027. If the test result in step 1021 is YES control is passed to step 1025 which removes all remaining $d_m$, $d_p$ groups from the set of groups, thereby leaving no remaining groups to be processed Control is then passed to step 1027. Conditional branch point 1027 tests to determine if there are any more $d_m$, $d_p$ groups remaining in the set of groups which need to be processed. If the test result in step 1027 is YES, control is passed back to step 1009 to get another group to be processed. If the test result in step 1027 is NO, control is passed to step 1029 for the performance of any optional quantization. Such quantization may actually be performed by quantizer 130. Control is then passed to step 1031 and the routine is exited. The final stored values of $a_m^*$, $a_p^*$, $d_m$, $d_p$ are available to be supplied as the motion vectors and corresponding optional weights. It will be recognized by persons skilled in the art that the above described invention may be employed on each component of a composite signal.

We claim:

1. A method for developing an encoded signal of a block of pels to be encoded located at a predetermined location in a frame of an applied video signal comprised of frames, wherein each frame contains at least one image representation, by developing a set of signals representing displacements and corresponding weights from at least two frames of said video signal that are designated as reference frames and are divided into blocks of pels, comprising the steps of:

a. storing said reference frames in a memory;
   b. selecting, in accordance with a predetermined selection criterion, for each of said reference frames, one or more candidate displacements, measured from said location of said block to be encoded, whose vector magnitude is less than or equal to the vector magnitude of a predetermined maximum displacement;
   c. culling, from said candidate displacements that have been determined, a set of groups of candidate displacements such that each group of said set has one candidate displacement member from each of said reference frames;
   d. ordering said groups of said set of groups in accordance with a predetermined ordering criterion;
   e. assigning to each group a set of best candidate weights for said group, one candidate weight corresponding to each member of said group;
   f. generating for each of said groups a composite error signal indicating differences between values of pels of said block being encoded and a weighted sum of values of pels of said blocks of said reference frames that are displaced, from said location of said block being encoded, by corresponding ones of said candidate displacements in said groups of said candidate displacements, said weighted sum being determined by multiplying corresponding ones of said values of pels of said blocks of said stored reference frames by corresponding ones of said set of best candidate weights for said group;

g. storing said best candidate weights, said corresponding group and said composite error signal for a group of said set of groups having a minimum composite error signal, if said composite error signal is less than any previously stored composite error signals or no composite error signal has been previously stored;

h. repeating steps (b) through (h) until a predetermined condition is met by a group of said candidate displacements and said corresponding set of best candidate weights for said group;

i. forming said encoded signal corresponding to said block, from which a version of said block can be reconstructed if a copy of said stored reference frames is available, by including in said encoded signal said group of candidate displacements and said set of best candidate weights for said group for which said predetermined condition is met; and j. delivering said encoded signal to a transmission medium.

2. The method as defined in claim 1 wherein in said step of selecting each one of said reference frames has a corresponding predetermined maximum individual displacement less than or equal to said predetermined maximum displacement.

3. The method as defined in claim 1 wherein at least one of said reference frames exists temporally in the future relative to said frame of said block being encoded and at least one of said reference frames exists temporally in the past relative to said frame being encoded.

4. The method as defined in claim 1 wherein at least two of said reference frames exist temporally in the past relative to said frame of said block being encoded and none of said reference frames exist temporally in the future relative to said frame being encoded.

5. The method as defined in claim 1 wherein said composite error signal is a sum of said differences squared.

6. The method as defined in claim 1 wherein said composite error signal is sum of absolute values of said differences.

7. The method as defined in claim 1 wherein said set of candidate displacements includes all possible ones of said candidate displacements in each of said reference frames.

8. The method as defined in claim 1 wherein said predetermined condition is that said composite error signal is less than or equal to a predetermined value.

9. The method as defined in claim 1 wherein said set of groups of candidate displacements culled includes all groups of said candidate displacements that can be distinguished.

10. The method as defined in claim 1 wherein said step of forming further includes the step of including in said encoded signal a representation of said differences.

11. The method as defined in claim 1 wherein said selection criterion denotes, for each of said reference frames and for all iterations of said step of selecting, displacements that are defined by having a same first endpoint at said location of said block to be encoded, and each having different second endpoints, said second endpoints being defined, upon a first iteration of said step of selecting as said location of said block and locations that are substantially equidistant therefrom by a predetermined distance from a predetermined set of distances and also substantially equidistant from each other, and upon any subsequent iterations of said step of selecting, by a location specified by a second endpoint of a candidate displacement that corresponds to said reference frame in a group that had a minimum composite error signal in an immediately preceding iteration of said step of generating, and displacements defined by locations substantially equidistant from said specified location by a distance from said predetermined set of distances and also substantially equidistant from each other.

12. The method as defined in claim 11 wherein said predetermined set of distances contains a distance for each iteration of said step of selecting, each of said distances for each successive iteration being progressively smaller and said predetermined condition is the exhaustion of members remaining in said set of distances.

13. The method as defined in claim 1 wherein said selection criterion denotes, upon a first iteration of said step of selecting, candidate displacements that correspond to displacements employed to encode at least one block adjacent to said block to be encoded.

14. The method as defined in claim 13 wherein said selection criterion denotes, upon subsequent iterations of said step of selecting, selecting for a particular reference frame a predermined subset of displacements, said particular reference frame being selected in a cyclic fashion from said reference frames each iteration of said step of selecting, and for each reference frame not said particular reference frame employing a corresponding displacement of said stored group.

15. The method as defined in claim 14 wherein said order criterion orders said groups based on a spiral around a most recent displacement employed in said particular reference frame from a group that most recently had a minimum composite error signal.

16. The method as defined in claim 13 wherein said selection criterion denotes, upon subsequent iterations of said step of selecting, selecting for a particular reference frame a predetermined subset of displacements, said particular reference frame being selected in a cyclic fashion from said reference frames upon each iteration of said step of selecting for which in an immediately preceding iteration of steps (b) through (h) a composite error signal less than any previously stored error signals was not stored, and for each reference frame not said particular reference frame employing a corresponding displacement of said stored group.

17. The method as defined in claim 16 wherein said selection criterion further selects only candidate displacements from said particular reference frame that have identical row components or identical column components as a candidate displacement from said particular frame for a group of candidate displacements that had a minimum composite error signal for an immediately preceding iteration of steps (b) through (h), said candidate displacements with either identical row components or identical column components being chosen in alternate fashion for each iteration of said step of selecting.

18. The method as defined in claim 1 wherein said step of assigning includes the steps of:

evaluating each element of a matrix M for each group of said set of groups, said matrix having elements arranged in columns and rows, one column and one row corresponding to each of said reference frames and arranged in a like order for both columns and rows, each of said columns and said rows having a label that identifies a block in said reference frame that corresponds to said column or said row and is displaced, from said location of said block being encoded, by a corresponding one of said candidate displacements in said group of said candidate displacements, wherein each of said elements are a sum of products of values of each corresponding pel location of blocks identified by said row label and said column label of said elements;

evaluating each element of a vector v having elements arranged in a column, each row of said column corresponding to one of said reference frames and ordered in like manner as said rows of said matrix M, each of said rows having a label that identifies a block in said reference frame that corresponds to said row and is displaced, from said location of said block being encoded, by a corresponding one of said candidate displacements in each of said groups of said candidate displacements wherein said elements are a sum of products of values of each corresponding pel location in each of said blocks identified by said row label and said block being encoded;

deriving for each of said groups a vector $u^*$ by solving the system of linear equations $M.u = v$, wherein elements of $u^*$ represent candidate weights, one candidate weight corresponding to each member of said group and ordered in like manner as said rows of said matrix; and employing said vector $u^*$ as said set of best weights assigned to each of said groups.

19. The method as defined in claim 18 wherein said columns of matrix M correspond from left to right to said reference frames arranged temporally in a sequential fashion and said leftmost column corresponds to a reference frame that is furthest in the past temporally of all of said reference frames.

20. The method as defined in claim 18 wherein said rows of matrix M correspond from top to bottom to said reference frames arranged temporally in a sequential fashion and said uppermost column corresponds to a reference frame that is furthest in the past temporally of all of said reference frames.

21. The method as defined in claim 18 wherein said step of deriving further requires that the sum of all members of said vector $u^*$ be one.

22. The method as defined in claim 18 further including the step of quantizing each weight of said vector $u^*$ corresponding to said group of candidate displacements for which said predetermined condition is met to a different vector $u^q$.

23. The method as defined in claim 22 wherein said quantization of weights of said vector $u^*$ is performed by employing quantization step sizes for each element of said $u^*$ such that any increase in a composite error signal generated for said quantized weights combined with said group of candidate displacements for which said overall predetermined minimization criterion has been achieved is not greater than a predetermined amount than said composite error signal generated for said corresponding weights of vector $u^*$ combined with said group of candidate displacements for which said overall predetermined minimization criterion has been achieved.

24. The method as defined in claim 23 wherein said step of deriving further requires that the sum of all members of said vector $u^*$ be one.

25. The method as defined in claim 23 in which two reference frames $I_m$ and $I_p$ are employed and said predetermined amount is $\Delta_{max}$, $m_{11}$ and $m_{22}$ are diagonal elements of matrix M, and $m_{12}$ is an anti-diagonal elements of matrix M, $\Delta\alpha_m$, $\Delta\alpha_p$ are quantization step sizes employed for frames m and p, respectively, and are required to be maintained less than or equal to, respectively, $m_{22}/m_{11}\Delta\alpha_p$ and $\sqrt{m_{11}\Delta_{max}/|M|}$.

26. The method as defined in claim 23 wherein said step of deriving further requires that the sum of all members of said vector $u^*$ be one such that said step size $\Delta\alpha$ is required to be maintained less than or equal to $\sqrt{\Delta_{max}/(m_{11}+m_{22}-2m_{12})}$.

27. The method as defined in claim 1 wherein said step of culling requires that all displacements in each of said groups are interrelated by a function of the relative times corresponding to said image representations within said reference frames.

28. The method as defined in claim 27 wherein said function of time is a ratio of the difference between said reference frames and said frame of said block being encoded.

29. Apparatus for developing an encoded signal corresponding to a block of pels to be encoded located at a predetermined location in a frame of a video signal that is supplied as an input, said video signal being comprised of frames wherein each frame contains at least one image representation by developing a set of signals representing displacements and corresponding weights from at least two frames of said video signal that are designated as reference frames and are divided into blocks of pels, comprising the steps of:

means for storing said reference frames;

means for selecting in accordance with a predetermined selection criterion, for each of said reference frames, at least one candidate displacement, measured from said location of said block to be encoded, whose vector magnitude is less than or equal to the vector magnitude of a predetermined maximum displacement;

means for culling from said candidate displacements that have been determined, a set of groups of candidate displacements such that each group of said set has one candidate displacement member from each of said reference frames;

means for ordering said groups of said set of groups in accordance with a predetermined ordering criterion;

means for assigning to each group a set of best candidate weights for said group, one candidate weight corresponding to each member of said group;

means for generating for each of said groups a composite error signal indicating differences between values of pels of said block being encoded and a weighted sum of values of pels of said blocks of said reference frames that are displaced, from said location of said block being encoded, by corresponding ones of said candidate displacements in said groups of said candidate displacements, said weighted sum being determined by multiplying corresponding ones of said values of pels of said blocks of said stored reference frames by corresponding ones of said set of best candidate weights for said group;

means for storing said best candidate weights, said corresponding group and said composite error signal for a group of said set of groups having a minimum composite error signal, if said composite error signal is less than any previously stored composite error signals or no composite error signal has been previously stored;

means for sequencing and coordinating operations of said means for selecting, said means for culling, said means for assigning, said means for generating and said means for storing in a repetitive manner until a predetermined condition is met by a group of said candidate displacements and said corresponding set of best candidate weights for said group;

means for forming said encoded signal corresponding to said block, by including in said encoded signal said group of candidate displacements and said set of best candidate weights for said group for which said predetermined condition is met; and means for supplying said encoded signal as an output.

* * * * *